UNITED STATES PATENT OFFICE.

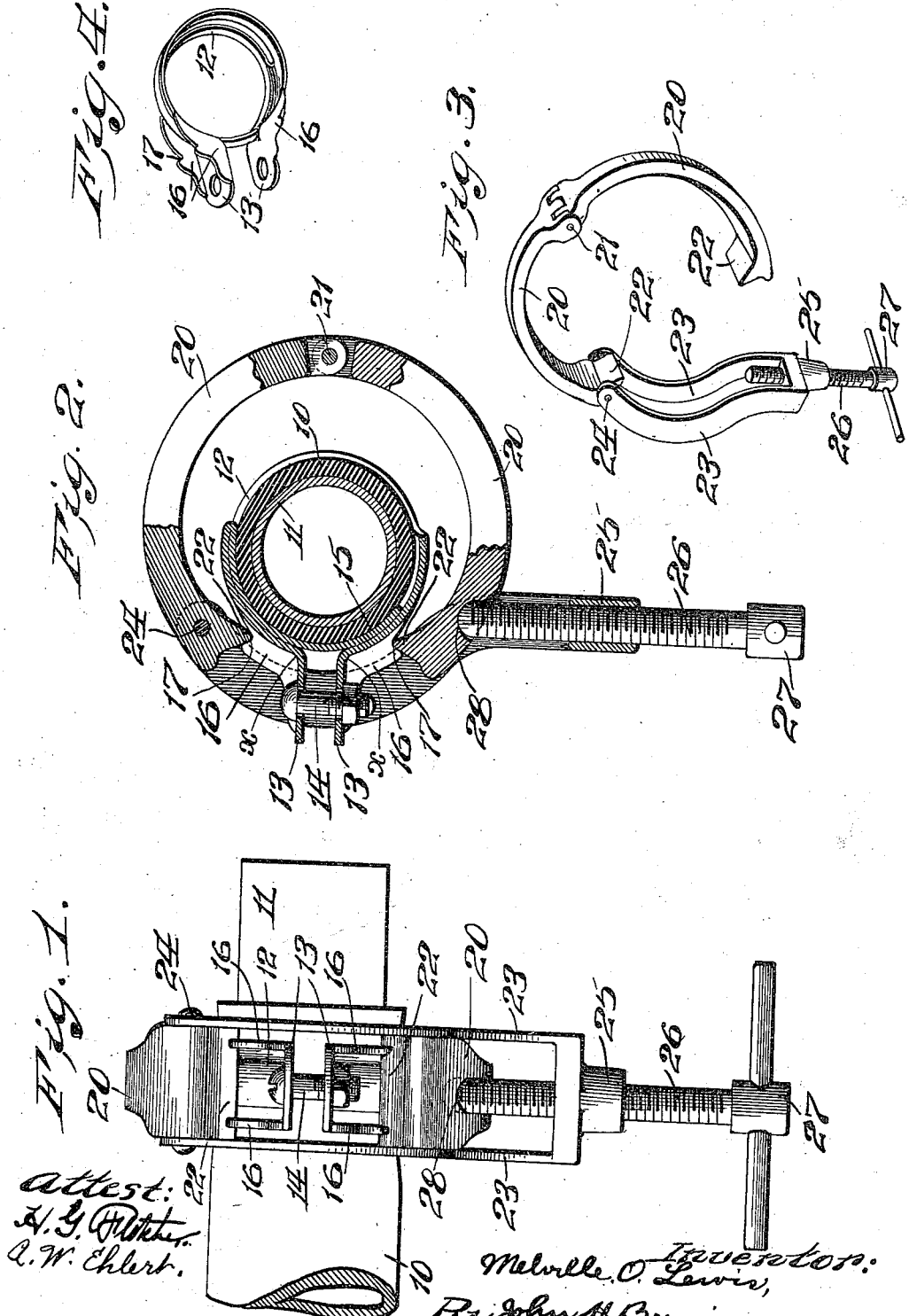

MELVILLE O. LEWIS, OF NEW YORK, N. Y.

HOSE-CLAMP-APPLYING TOOL.

989,855. Specification of Letters Patent. Patented Apr. 18, 1911.

Application filed December 17, 1910. Serial No. 597,968.

*To all whom it may concern:*

Be it known that I, MELVILLE O. LEWIS, a citizen of the United States, residing at New York, in the county of New York and State of New York, have invented a new and useful Hose-Clamp-Applying Tool, of which the following is a specification.

This invention relates to tools for applying clamps to hose or similar devices.

In the use of hose or flexible tubing, it is necessary to join the hose to metallic piping. This is accomplished by applying a clamp consisting of a band around the hose end, and securing and clamping the same in position by a suitable fastener as a screw or bolt and nut. Similar clamping bands are used for joining two hose sections, by inserting a short tube in the ends to be joined and applying bands on the abutting ends of the hose. While the band may be clamped in position by its own fastening means, this necessarily requires a long bolt or screw, which must be cut off after it is in place in order to avoid the undesirable projecting end. In addition it is impossible to obtain the necessary leverage with an ordinary screw driver, and a wrench is out of the question in the cramped space allowed. Such a practice also necessitates the use of an abnormally large bolt and thread where the clamp must be made extremely tight as is the case with high pressure piping.

One of the objects of this invention therefore is to construct a tool by means of which a clamp can be easily and quickly applied so as to make a tight joint.

Another object is to construct this tool so that free manipulation of the fastening means is permitted, the fastening means being applied after the clamp is in position and clamped.

Another object is to simplify the construction of this tool so that it will be cheap to manufacture, consist of a few parts and arranged to be used on hose or piping no matter in what position or condition.

Further objects will appear from the detail description taken in connection with the accompanying drawings in which, Figure 1 is a plan view showing the tool in position and after it has applied the clamp, Fig. 2 is a section of Fig. 1, certain parts being shown in elevation, Fig. 3 is a perspective view of the tool, and Fig. 4 is a perspective view of one form of clamp which may be applied by this tool.

Referring to the drawings, 10 designates an ordinary rubber hose which is arranged to be clamped on a tubular member 11, which may be the end of a line of metallic piping, or a short pipe arranged to have another hose section clamped on its other end and abutted against the hose section shown as hereinbefore referred to. A form of clamp which may be used is shown in Fig. 4 and consists of a band 12 provided with perforated flanges 13 adapted to receive a bolt or screw 14. The clamp shown is of sheet metal construction and has a portion 15 cut from the body and bent back to form a backing underneath the flanges 13. The body of the clamp is further stamped to form side flanges 16 provided with shoulders 17. This clamp is arranged to be applied to a hose and clamped thereon so as to make a fluid tight joint, and after it is clamped it is secured in position by the bolt or screw.

The tool comprises a pair of jaws 20 jointed together at one of their ends by a pivot pin 21 and provided at their other ends with lugs or shoulders 22. A yoke comprising side members 23 is jointed to one of the jaws at 24 and is provided at the other end with a head 25 which is tapped to receive the threaded shank of a clamping screw 26. This clamping screw is provided at one end with a T shaped head 27 forming a handle and the other end is rounded to engage a rounded recess 28 in the other jaw. The jaws 20 and the yoke are preferably forgings, but they may be constructed in any other suitable manner.

The tool is so constructed that it can embrace any ordinary sized hose or pipe but it may be made of different sizes for different sized hoses or pipes. The side members of the yoke are spaced apart so that they can embrace the flanges 13 as shown in Fig. 1.

The operation of applying a clamp will now be described: The clamp with the fastening bolt removed is placed on the hose, and the tool placed around the hose in a position with the shoulders 22 on the jaws bearing against the shoulders 17 on the clamp. The yoke is then swung over the end of the lower jaw so that the end of the clamping screw 26 will engage the recess 28 as shown in Figs. 1 and 2. The screw 26 can now be screwed up until the clamp is firmly clamped on the pipe. The fastening bolt can now be placed in position and screwed up by a screw driver and the tool can then be removed.

Upon an inspection of Fig. 2 and a study of the application of the forces by the tool on the clamp, it will be seen that their direction is such as to promote a free sliding action of the clamp parts on the hose, while the frictional resistance is reduced to a minimum. This is due to the fact that the forces are practically tangential and not radial. The yoke is of open construction and is cut away so that the fastening bolt can be easily inserted and removed and screwed up while the tool is in position. This enables the bolt to be inserted and secured when the clamp is drawn up; in this way all strain which would be caused by drawing up the bolt is avoided and the joint can be made exceedingly tight with an ordinary screw driver. The tool being of jointed construction can be easily folded up so as to occupy a small space. The free jaw, the lower one in Figs. 2 and 3, will in folded position enter between the side members 23 and the yoke will swing over it. This is of great advantage in shipping and storing such tools.

It will thus be seen that this invention accomplishes the objects aimed at.

The tool is simple in construction and easy to manipulate.

The clamp can be applied without necessitating a heavy bolt and one which is so long that it is necessary to cut it off after it is in place. The open construction of the yoke and the arrangement of the jaws permit of easy manipulation of the fastening bolt so that it can be secured in place by simple and ordinary tools.

Only one type of clamp is shown. It will be obvious however that other types may be applied by tools embodying the principles of this invention. Thus the clamp need not be provided with shoulders 17, but the shoulders 22 on the tool jaws may engage the flanges 13 directly, at for instance the corners $x, x$. Although the invention is particularly useful for applying clamps to rubber hose, it will be obvious, and it must be understood, that it can be used for applying clamps to other similar devices.

It is further obvious that various changes may be made in the details of construction without departing from the spirit of this invention and it is therefore to be understood that this invention is not to be limited to the specific construction shown and described.

Having thus described the invention what is claimed is as follows:—

1. A hose clamp applying tool comprising, a pair of connected jaws adapted to engage a clamp, a yoke jointed to the free end of one of said jaws and having a detachable connection to the free end of the other jaw, and clamping means on said yoke.

2. A hose clamp applying tool comprising, a pair of jointed jaws having shoulders thereon adapted to engage coöperating shoulders on a clamp, and a yoke jointed to one jaw and engaging the other jaw adapted to connect said jaws and draw them together.

3. A tool for applying hose clamps having fastening means for securing the clamp in position, comprising, a pair of connected jaws adapted to engage the clamp, and a yoke adapted to connect and clamp the free ends of said jaws, said parts being constructed to permit manipulation of the fastening means while the tool is in position.

4. A tool for applying hose clamps having fastening means for securing the clamp in position, comprising, a pair of connected jaws adapted to engage the clamp, and a yoke adapted to connect and clamp the free ends of said jaws, said yoke being open and cut away to permit manipulation of the fastening means while the tool is in position.

5. A tool for applying hose clamps having fastening means for securing the clamp in position, comprising, a pair of connected jaws adapted to embrace and engage the clamp, and a yoke engaging the free ends of said jaws, said yoke being of open construction and being adapted to embrace the clamp and permit manipulation of the fastening means while the tool is in position.

6. A tool for applying hose clamps having fastening means for securing the clamp in position, comprising, a pair of connected jaws adapted to embrace and engage the clamp, and a yoke connecting the free ends of said jaws, said jaws terminating below the fastening means to permit manipulation thereof while the tool is in position.

7. A hose clamp applying tool comprising, a pair of connected jaws adapted to engage a clamp, a yoke pivoted to the free end of one of said jaws and detachably engaging the free end of the other, and a clamping screw on said yoke.

8. A hose clamp applying tool comprising, a pair of connected jaws adapted to engage a clamp, a yoke pivoted to the free end of one of said jaws, the free end of the other jaw being provided with a recess, and a clamping screw on said yoke engaging said recess.

9. A hose clamp applying tool comprising a pair of jointed jaws adapted to engage a clamp, and a clamping yoke engaging and connecting the free ends of said jaws, said parts being constructed to be folded together.

10. A hose clamp applying tool comprising a pair of jointed jaws adapted to engage a clamp, and a clamping yoke connecting the free ends of said jaws, said yoke comprising a pair of spaced side members embracing the jaws, and said yoke being pivoted at one end to one jaw and adapted to detachably engage the other jaw, the jaws and yoke forming connected links adapted to be folded together.

In testimony whereof I affix my signature in presence of two witnesses.

MELVILLE O. LEWIS.

Witnesses:
  JAMES S. CLARK,
  EGBERT G. BROWN.

Copies of this patent may be obtained for five cents each, by addressing the "Commissioner of Patents, Washington, D. C."